Jan. 17, 1939.　　　　　R. K. LEE　　　　　2,144,161
DOOR FOR CLOSED BODY VEHICLES
Filed Nov. 27, 1936　　　3 Sheets-Sheet 1

INVENTOR.
ROGER K. LEE.
BY
ATTORNEYS.

Jan. 17, 1939.  R. K. LEE  2,144,161
DOOR FOR CLOSED BODY VEHICLES
Filed Nov. 27, 1936  3 Sheets-Sheet 2
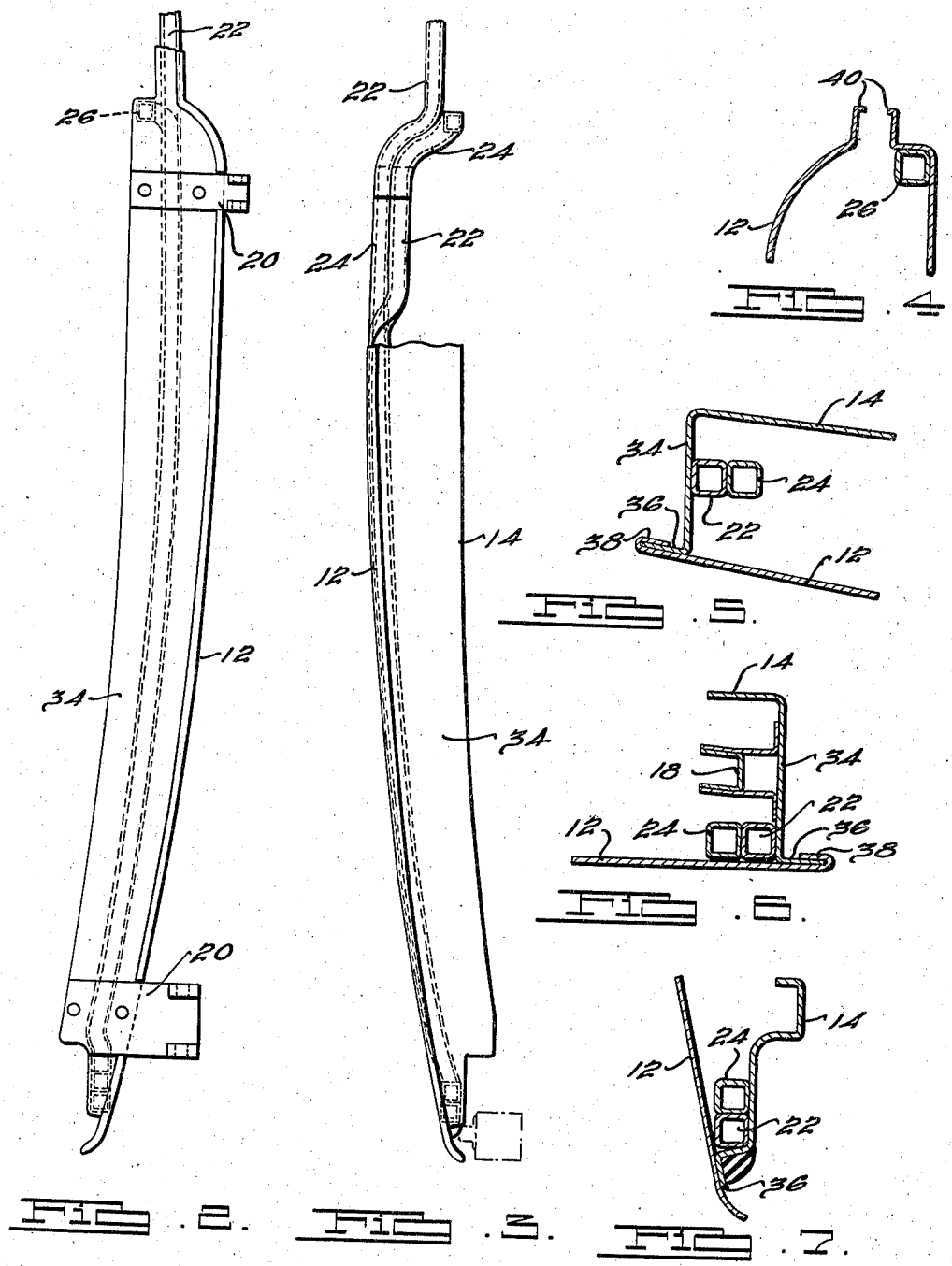
INVENTOR.
ROGER K. LEE.
BY
ATTORNEYS.

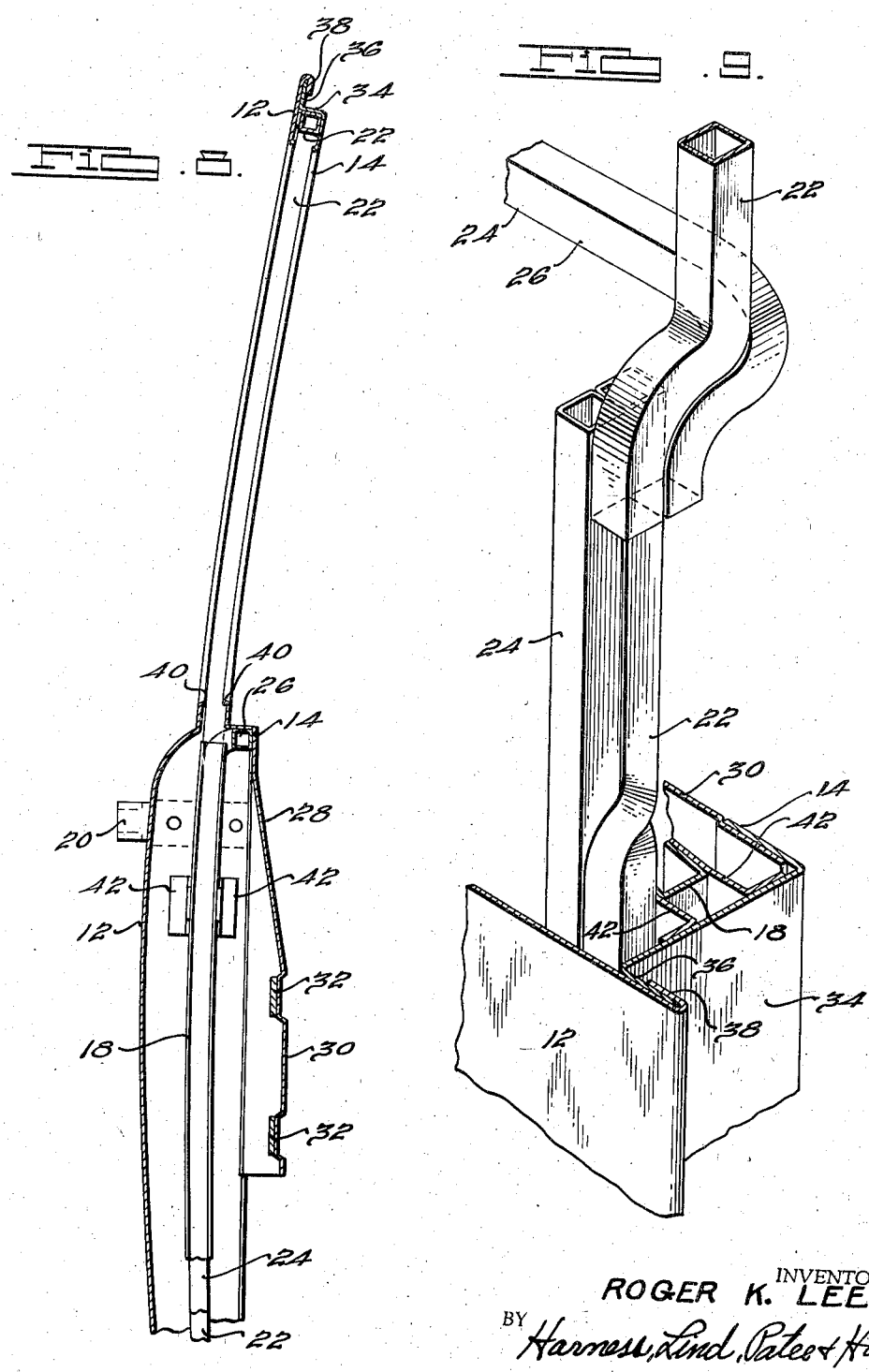

Patented Jan. 17, 1939

2,144,161

UNITED STATES PATENT OFFICE 2,144,161

DOOR FOR CLOSED BODY VEHICLES

Roger K. Lee, Highland Park, Mich., assignor to Chrysler Corporation, Highland Park, Mich., a corporation of Delaware Application November 27, 1936, Serial No. 112,871

5 Claims. (Cl. 296—44)

This invention relates to doors for closed body vehicles and more particularly to such a door made out of pressed metal stampings.

An object of the invention is to provide a metal door construction which is economical to manufacture and assemble because of the few and simple parts used therein but which, at the same time, possesses strength and stability.

Another object of the invention is to provide a door construction composed of simple, formed stampings and the provision of a tubular frame structure to which may be spotwelded the stampings.

Other objects and advantages of the invention will be more fully understood from the description taken in connection with the accompanying drawings, in which Fig. 1 is an outside elevation of the door, parts being shown dotted and parts being broken away and in section;

Fig. 2 is a front end view of the door shown in Fig. 1;

Fig. 3 is a rear end view of the door shown in Fig. 1, the upper portion of the inner and outer panels being broken away to more clearly show a tubular frame structure;

Figs. 4, 5, 6 and 7 are detailed sectional views taken respectively on line IV—IV, V—V, VI—VI and VII—VII of Fig. 1;

Fig. 8 is a sectional view taken on line VIII—VIII of Fig. 1; and

Fig. 9 is a perspective view showing a portion of the door in section and the method of joining the ends of the tubular members forming the door frame structure.

Figure 1:
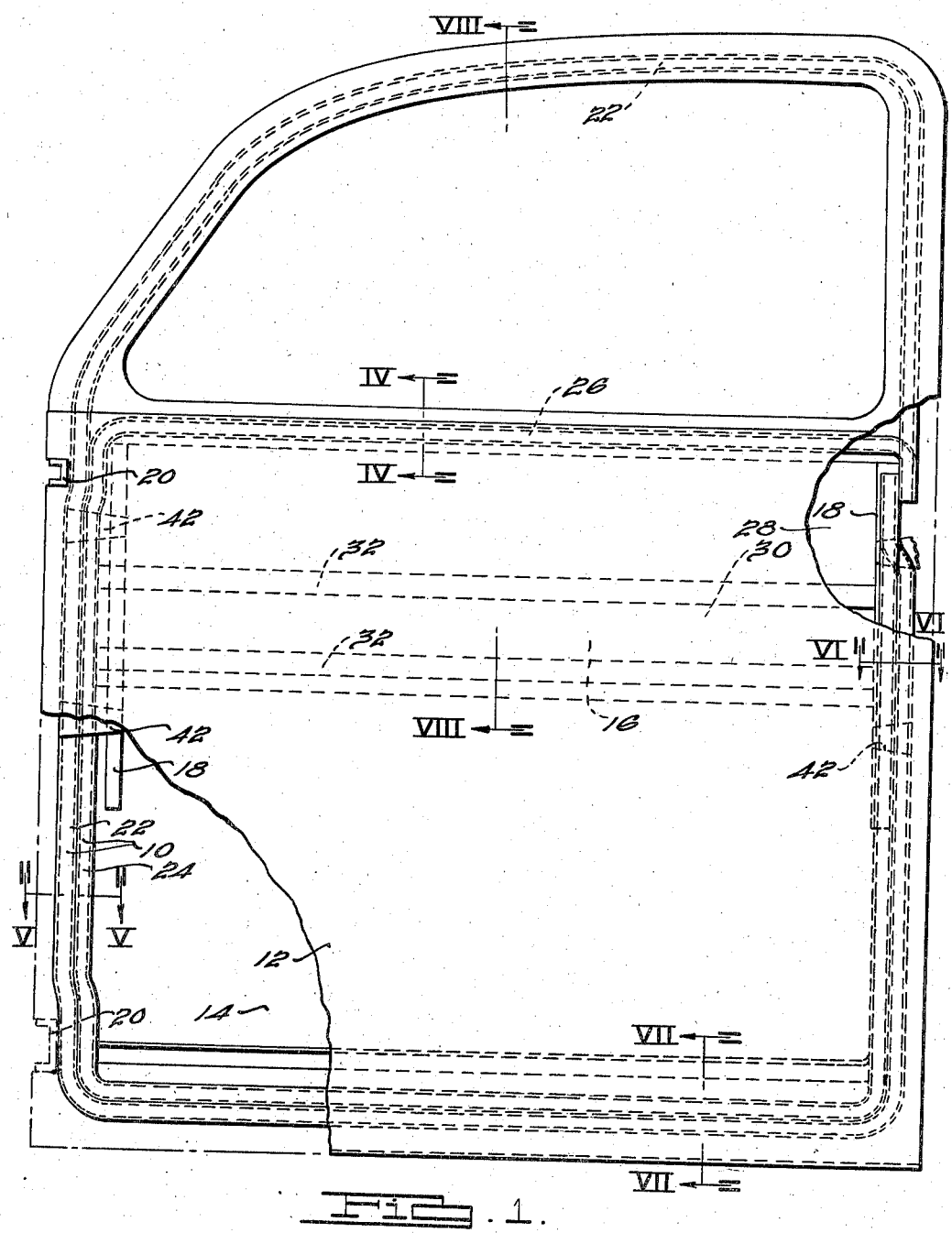

Referring to the drawings and more particularly to Fig. 1, the door comprises a tubular frame structure 10, an outer panel 12, an inner panel 14, transverse control support rails 16, glass run channels 18 and hinge members 20. The glass, its control mechanism for raising and lowering the window and the door trim have not been shown.

The tubular frame structure 10 is formed from two tubular members 22 and 24, preferably rectangular in cross section, bent into the desired shape from straight lengths of tubing. The outer tube 22 is bent into a substantially rectangular form conforming to the outline of the door and has its opposite ends adjacent and overlapping vertically but not in longitudinal alignment. This is more clearly shown in the perspective view Fig. 9. The inner tube 24 is bent into a substantially rectangular form with its two sides and bottom edges in contact with the inner surface of the outer tubular member 22 and its upper portion 26, at the belt line, spaced intermediate the top and bottom portions of the outer tube 22, defining a window portion above the upper portion 26 of the inner tube and a main body portion below the upper portion 26.

At the rear edge of the door, the right edge of Fig. 1, the lower end of the outer tubular frame 22 is bent around in back of the lower end of inner tubular member 24. This is more clearly shown in the perspective view, Fig. 9. The upper ends of the tubular members 22 and 24 are arranged with the end of the inner tubular member 24 in back of the outer tubular member 22 and both upper ends are extended longitudinally into overlapping relation with the lower ends of the tubes.

It will be noted that by this arrangement the upper end of the tube 22 is secured, preferably by welding, to the lower end of the tube 24 and that the upper end of the tube 24 is secured to the lower end of the tube 22. This provides a construction wherein the frame 10 is an endless strip having a portion thereof of double tubular thickness and another portion of single tubular thickness.

An inner panel 28 is secured, preferably by spotwelding, to the frame 10. In order to reduce the weight of the inner panel 28 and to provide an opening for the window, portions thereof are cut away so that the inner panel is substantially a frame corresponding generally in shape to the tubular frame 10 except that the transverse portion 30 thereof at the belt line is larger. The transverse portion 30 is provided with reinforcing strips 32 which together with the transverse portion 30 make up the control support rail 16.

The inner panel 28 has its edges bent outwardly at right angles to the plane of the inner panel 14 forming a jamb face 34 and the outer edge of the jamb face 34 is bent outwardly parallel to the plane of the inner panel 14 forming a flange 36.

The outer panel 12 has its edges 38 bent around the flange 36 and secured thereto, preferably by welding. The upper portion of the outer panel 12 has a section cut away corresponding to the inner panel 14 to provide a window opening. The edges on the outer and inner panels around the window opening are bent toward each other forming a flange 40 to provide a smooth outer surface. The edges of the flanges are spaced apart to receive a glass panel therebetween.

The glass run channels 18 are carried by the inner panel 14, being secured to the jamb face 34 by angular metallic strips 42 spotwelded to the glass run channel 18 and the jamb face 34.

As shown in Fig. 8, the glass run chanel 18 and upper window portion are slightly curved to guide a glass which is correspondingly curved.

It will be understood that various changes including the size, shape and arrangement of parts may be made without departing from the spirit of my invention and it is not my intention to limit its scope other than by the terms of the appended claims.

I claim:

1. In a door for closed body vehicles, an inner panel having inturned edges to form the jamb faces of the door, an outer panel having its edges secured to the inturned edges of said inner panel, a tubular frame member between said panels extending around the perimeter of said door and another tubular frame member extending along the bottom edge, partially along the two side edges and transversely between the top and bottom edges.

2. In a door for closed body vehicles having a lower body portion and an upper window portion, a tubular frame for said door comprising a single tubular member around the perimeter of said door and another tubular member around the perimeter of the body portion of said door, an inner panel secured to said frame, and an outer panel secured to said inner panel.

3. In a door for closed body vehicles, having a lower body portion and an upper window portion, a tubular frame for said door comprising two tubular members, one conforming to the perimeter of the door and the other conforming to the perimeter of the body portion of said door, one end of said first named member being secured to one end of said second named member and the other end of said first named member being secured to the other end of said second named member, an inner panel secured to said tubular frame, and an outer panel secured to said inner panel.

4. In a door for closed body vehicles, a tubular frame structure forming a main body portion and a window portion, a transverse support in the body portion of said door secured at its opposite ends to said tubular frame structure, glass run channels secured to said tubular frame, an inner panel and an outer panel, one of said panels being secured to said tubular frame and the other panel being secured to the one panel.

5. In a door for vehicle bodies having a lower body portion and an upper window portion, a tubular frame for said door having a single tubular portion around the perimeter of said window portion and having a double tubular portion around the perimeter of said lower body portion.

ROGER K. LEE.